3,102,391
HIGH COMPRESSION TORQUE AND PROPULSION JET REACTION ENGINE
James N. Preston, 1633 W. Campbell, Phoenix, Ariz.
Filed Oct. 2, 1961, Ser. No. 142,344
2 Claims. (Cl. 60—39.35)

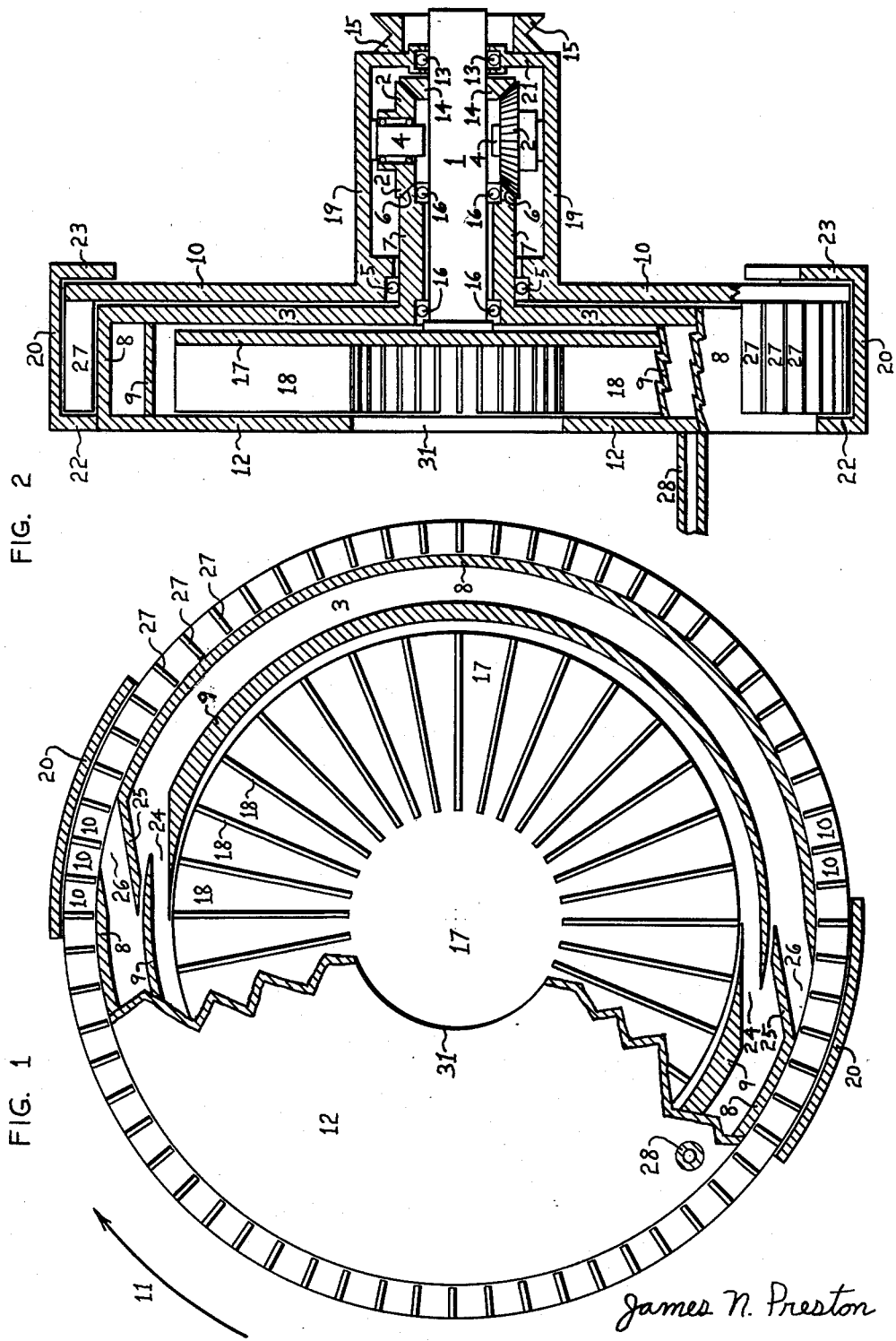

This invention is an improved modification of my earlier invention entitled: Torque and Propulsion Reaction Engine #3. The improvement is in the air compressor which employs a geared-up air impeller rotor which provides a much greater amount of compressed air per r.p.m. which results in a much greater increase in torque and propulsion thrust per r.p.m. with a great reduction of high-pitched engine noise.

This engine has the unique ability to harness low-pressure exhaust gases escaping from the combustion chamber to provide combustion intake air entering the combustion chamber from the geared-up air impeller assembly with a much higher pressure which generates a great amount of torque horsepower with a very high degree of efficiency.

The engine otherwise has the same characteristics of my torque and propulsion reaction engine #3 with the combustion chamber only slightly modified but retaining its ability to remain cool without over-heating at any r.p.m. The combustion exhaust back-pressure assembly is slightly modified but retains its characteristic of being exposed to outside air which keeps it from overheating. This invention is a continuation-in-part of applicants' co-pending patent application entitled: Super-Charged Torque and Propulsion Reverse Reaction Engine, Serial No. 139,137, filed September 19, 1961.

FIGURE 1 shows the front view of the engine with part of the engine housing cut away to expose a segment of the combustion chamber, air impeller assembly, combustion air intake port, combustion exhaust port, combustion exhaust deflector and other parts.

FIGURE 2 shows the adjacent side view of the engine when the front view is rotated 90 degrees to its right on its vertical axis with part of the engine housing, one planetary gear, center hub, back-pressure hub, and other parts cut away to expose a segment of the combustion chamber, air impeller assembly, rotor vanes, axle, planetary axles, planetary gears, and other parts.

Referring in more detail to the drawing, 17 indicates the air impeller disc. The right circular axle 1 is affixed to the radial center of, and extends perpendicular from, the adjacent face of the air impeller disc 17 for a distance. A number of air impeller vanes 18 are affixed perpendicular to the face of said air impeller disc 17 opposite to the face affixed to the axle 1 and extend along radial lines from the periphery of the air impeller disc 17 toward the axis of the axle 1 to a perimeter having a somewhat smaller radius. Said axle 1 and affixed air impeller assembly rotates clockwise 11 on the ball bearings 16 within the right circular stationary center hub 7 which is closely parallel adjacent at one right circular end to the adjacent face of the air impeller disc 17 and having a shorter axial length than the axle 1.

The stationary center disc 3 is affixed to the periphery of the center hub 7 and extends outward in a plane perpendicular to the axis of the axle 1 and closely parallel adjacent to the air impeller disc 17 to a perimeter having a radius somewhat greater than that of the said air impeller disc 17.

The combustion chamber is located on the face, adjoining the periphery, of the center disc 3 and extends from the periphery of said center disc 3 for a distance toward the axis of the axle 1 to a perimeter having a somewhat smaller radius and perpendicular from the face of said center disc 3 across, to a line in a plane slightly beyond, the plane of the air impeller vanes 18 and parallel to the plane of the center disc 3. Said combustion chamber is contained on its periphery by the combustion outer cylinder 8 which is affixed at one right circular end to the periphery of the center disc 3 and extends perpendicular from the face of said center disc 3 for a distance to adjoin the combustion ring disc 12 located in the plane slightly beyond the plane of the air impeller vanes 18 and parallel to the plane of the center disc 3. The axis-toward side of the combustion chamber is contained by the combustion inner cylinder 9 which extends perpendicular from the face of the center disc 3, along a somewhat smaller radius than that of the combustion outer cylinder 8 and slightly greater than that of the air impeller vanes 18, to adjoin the adjacent face of the combustion ring disc 12 which extends from the periphery of the combustion outer cylinder 8 toward the axis of the axle 1 to the air intake port 31 having a perimeter on a radius equal to that of the axis-toward edges of the air impeller vanes 18. The combustion chamber is airtight except for a number of combustion air intake ports 24 cut through the combustion inner cylinder 9, a number of combustion exhaust ports 26 cut through the combustion outer cylinder 8, and a number of fuel intake jets, each extending from each fuel pipe 28 through the combustion ring disc 12 into the combustion chamber.

Each combustion air intake port 24 is cut outward through the combustion inner cylinder 9 in a clockwise 11 direction on a line that is tangent to the periphery of the air impeller vanes 18 and clockwise 11 adjacent to each combustion exhaust port 26. The axis-toward side of the combustion inner cylinder 9 is closely adjacent to the periphery of the air impeller vanes 18 in the immediate vicinity of each combustion air intake port 24 and proceeds to have a steadily increasing radius at a point moving clockwise 11 to the next adjacent combustion air intake port 24 to present a spiral surface on its axis-toward side to conduct air into each combustion air intake port 24 in a clockwise 11 direction.

The air impeller vanes 18 force intake air from the air intake port 31 outward by centrifugal force clockwise 11 into the combustion chamber through each combustion air intake port 24. Fuel is pumped into the combustion chamber in the vicinity of each combustion air intake port 24 through each fuel intake jet extending through the combustion ring disc 12. The ignited and expanding gases are allowed to escape from the combustion chamber at each combustion exhaust port 26. The combustion exhaust baffle 25, extending perpendicular from the face of the center disc 3 to adjoin the adjacent face of the combustion ring disc 12, is affixed at one end to the combustion outer cylinder 8 adjoining the clockwise 11 side of the combustion exhaust port 26 and extends in a counter-clockwise direction for a distance on a line that is tangent to the periphery of the combustion inner cylinder 9 to allow the combustion exhaust gases to escape from the combustion chamber in a clockwise 11 tangent direction.

The right circular back-pressure hub 19 rotates clockwise 11 on the ball bearings 5 around the periphery of the center hub 7 and is closely parallel adjacent at one right circular end to the adjacent face of the center disc 3. Said back-pressure hub 19 extends on a line parallel to the axis of the axle 1, beyond the plane of the center hub 7 for a distance to adjoin the support disc 21 which extends toward the axis of the axle 1 to a perimeter having a radius somewhat greater than that of the axle 1 which rotates clockwise 11 on the ball bearings 13 within the said axis-toward perimeter of the support disc 21.

At an axial distance from the right circular unaffixed end of the center hub 7 and parallel adjacent to the adjacent face of the support disc 21, the axle ring gear 14 is affixed around the periphery of the axle 1 and extends outward in a plane perpendicular to the axis of the axle 1 to a perimeter having a radius generally equal to that of the center hub 7. The face of said axle ring gear 14 adjacent to the end of the center hub 7 is provided with gear teeth cut into a 45 degree bevel which is cut from a perimeter having a somewhat smaller radius 45 degrees outward to the periphery of said axle ring gear 14. The adjacent end of the center hub 7 is likewise provided with like gear teeth cut into a 45 degree bevel which is cut from a perimeter having a somewhat smaller radius 45 degrees outward to the adjacent periphery of said center hub to form the center hub ring gear 6.

In a plane perpendicular to the axis of the axle 1 and located between the axle ring gear 14 and the center hub ring gear 6, a number of planetary axles 4 extend from the axis-toward side of the back-pressure hub 19 along radial lines for a distance toward the axis of the axle 1. A planetary gear 2 rotates around each planetary axle 4 with its gear teeth cut into a 45 degree bevel to mesh with the gear teeth of the axle ring gear 14 and with the gear teeth of the center hub ring gear 6 to conduct the clockwise 11 rotation of the back-pressure hub 19 and affixed planetary axles 4, around each said planetary axle 4 to rotate the axle ring gear 14 and affixed axle 1 at a much higher clockwise 11 velocity. The pulley 15 is affixed to the adjacent face of the support disc 21 to conduct torque horsepower from the engine.

The back-pressure disc 10 is affixed around the periphery of the back-pressure hub 19 and extends outward in a plane perpendicular to the axis of the axle 1 and closely parallel adjacent to the center disc 3 to a perimeter having a radius somewhat greater than that of the center disc 3. A number of back-pressure vanes 27 extend perpendicular from the face of the back-pressure disc 10 and from a radius slightly greater than that of the combustion outer cylinder 8, radially outward to the periphery of said back-pressure disc 10. Each back-pressure vane 27 extends across, and closely parallel adjacent to, the periphery of the combustion outer cylinder 8. The combustion exhaust gases escaping from within the combustion chamber impinge against the back-pressure vanes 27 to rotate said back-pressure vanes 27, back-pressure disc 10, and back-pressure hub 19 clockwise 11 to produce torque and thrust.

The back-pressure housing extends for a distance on the clockwise 11 and counter-clockwise side of each combustion exhaust port 26 to prevent the combustion exhaust gases from freely escaping from the influence of the back-pressure vanes 27 in the vicinity of each combustion exhaust port 26 and consists of the back-pressure cylinder segment 20, the back-pressure ring disc segment 22, and the second back-pressure ring disc segment 23. The back-pressure cylinder segment 20, located on a radius slightly greater than the periphery of the back-pressure vanes 27, is held in place by the adjoining back-pressure ring disc segment 22 which extends outward from the periphery of the combustion outer cylinder 8, in the plane of the combustion ring disc 12 and closely adjacent to the adjacent edges of the back-pressure vanes 27. Said back-pressure cylinder segment 20 extends closely adjacent across the periphery of said back-pressure vanes 27 and back-pressure disc 10 to adjoin the second back-pressure ring disc segment 23 which extends for a distance toward the axis of the axle 1 in a plane closely parallel adjacent to the back-pressure disc 10.

I claim:

1. A reaction engine comprising a means to provide thermal energy from combustion of any combustible fuel and to provide torque energy and propulsion thrust from thermal energy; a combustion chamber provided which being contained within a combustion outer cylinder by means of a combustion ring disc and a stationary center disc which concentrically adjoin said combustion outer cylinder; said combustion chamber contained on its axis-toward side by means of a concentric combustion inner cylinder which concentrically adjoins said combustion ring disc and said stationary center disc; said combustion chamber provided with at least one combustion air intake port which located generally in the combustion inner cylinder; said combustion chamber provided with at least one combustion exhaust port which located generally in the combustion outer cylinder; said combustion exhaust port provided with a substantially larger cross-section area than that of the combustion air intake port; said combustion chamber provided with at least one fuel intake jet which located generally in the combustion inner cylinder; an axle located generally concentric with the combustion outer cylinder and rotating on bearings within a center hub which is in connection with the stationary center disc; an axially concentric back-pressure hub provided which being rotatable around the axis of the axle on bearings located generally around the periphery of the axle and the periphery of the center hub; an axially concentric back-pressure disc provided which being concentrically affixed to the back-pressure hub; a planetary type gear train provided for the purpose of gearing the back-pressure hub to the axle and to the center hub thereby providing said axle with a higher r.p.m. velocity than that of said back-pressure hub when said back-pressure hub being rotated around the axis of the axle; a plurality of back-pressure vanes provided to form a type of turbine which being rotatable around the axis of the axle generally in the plane of the combustion exhaust port; each back-pressure vane connected to the back-pressure disc and extending in a general axial direction for a distance; each said back-pressure vane extending outward for a distance in a general radial direction from an axially concentric perimeter located concentric with the axis of the axle and which provided with a diameter generally slightly greater than the diameter of the periphery of the combustion outer cylinder; each said back-pressure vane provided with a cross-section surface area at least as large as the cross-section area of the combustion exhaust port and located whereby rotating around the axis of the axle generally in the plane of the combustion exhaust port; a suitable generally centrifugal-type axle-driven air compressor provided which being in connection with the stationary center disc and activated by the axle for the purpose of providing compression of fluid, generally air, continuously through the combustion air intake port into the combustion chamber when the axle being rotated around its axis; thermal energy provided within said combustion chamber for the purpose of providing said fluid therein with a substantially larger fluid volume therein by means of fluid expansion therein thereby providing a fluid exhaust velocity and p.s.i. pressure to said larger fluid volume at the combustion exhaust port to a degree approaching the intake fluid velocity and p.s.i. pressure of compressed fluid within the combustion air intake port prior to entering said combustion chamber; any combustible fuel forced through the fuel intake jet into said combustion chamber generally by pump means wherein said fuel ignited by ignition means to compressed fluid, normally compressed air, thereby providing thermal energy and a larger fluid volume therein; larger fluid volume consisting normally of ignited and expanding combustion gases and exhausting from the combustion chamber through the combustion exhaust port generally directly into the plane and influence of the back-pressure vanes generally from the axis-toward side of said back-pressure vanes; a means provided which being located generally within the combustion chamber for the purpose of directing the exhausting larger fluid volume from the combustion chamber and the combustion exhaust port generally directly into the plane and influence of the back-pressure vanes in a general tangent general axially transverse direction generally from the axis-toward side of said back-pressure vanes whereupon said larger fluid volume impinging against a surface area of each back-pressure vane in the path of the exhausting larger fluid volume which provides said back-pressure vanes and back-pressure disc with continuous rotation around the axis of the axle thereby providing torque energy to the axle by the planetary gear train means which activates the air compressor which provides continuous compression of fluid into the combustion chamber thereby continuing the cycle providing continuous torque energy and propulsion thrust from thermal energy.

2. The invention as claimed in claim 1 wherein an axially concentric back-pressure means provided which includes rotating and stationary back-pressure walls for the purpose of enclosing the plane and influence of the back-pressure vanes; each respective back-pressure wall located closely adjacent to each respective side of the plane and influence of the back-pressure vanes for the purpose of substantially containing the exhausting larger fluid volume within the plane and influence of the back-pressure vanes thereby providing continuous fluid p.s.i. back-pressure and velocity between said combustion exhaust port of the combustion chamber and adjacent back-pressure vanes to a degree approximately equal to fluid p.s.i. pressure and velocity of said larger fluid volume within said combustion chamber which causes said back-pressure vanes to rotate continuously around the axis of the axle and away from the vicinity of said combustion exhaust port thereby providing said back-pressure vanes with a degree of continuous torque energy proportional to the cross-section area of the combustion exhaust port and to the degree of fluid p.s.i. pressure and velocity of said exhausting larger fluid volume; the back-pressure means including back-pressure walls located concentrically adjacent to each side of the plane of said back-pressure vanes and to the axis-toward side and peripheral side of said back-pressure vanes; said back-pressure walls located concentric with the axis of the axle and generally concentric with the combustion chamber and generally in the plane of the combustion exhaust port; at least one of the aforesaid back-pressure walls of the back-pressure means being segmented for the purpose of providing an exhaust means for said exhausting larger fluid volume from within the back-pressure means and the plane and influence of the back-pressure vanes generally into the atmosphere after an arc distance of containment therein thereby continuing the cycle which provides continuous torque energy and propulsion thrust from thermal energy.

References Cited in the file of this patent
UNITED STATES PATENTS

| | | |
|---|---|---|
| 2,499,863 | Hart | Mar. 7, 1950 |
| 2,670,597 | Willemejane | Mar. 2, 1954 |

FOREIGN PATENTS

| | | |
|---|---|---|
| 547,539 | France | Sept. 25, 1922 |
| 485,826 | Italy | Oct. 19, 1953 |